United States Patent
Trifonov

(10) Patent No.: US 11,263,779 B2
(45) Date of Patent: Mar. 1, 2022

(54) SENSORS POSITIONS DETERMINATIONS

(71) Applicant: HEWLETT-PACKARD DEVELOPMENT COMPANY, L.P., Houston, TX (US)

(72) Inventor: Dmitry Trifonov, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 722 days.

(21) Appl. No.: 16/075,893

(22) PCT Filed: Jun. 20, 2017

(86) PCT No.: PCT/US2017/038270
§ 371 (c)(1),
(2) Date: Aug. 6, 2018

(87) PCT Pub. No.: WO2018/236347
PCT Pub. Date: Dec. 27, 2018

(65) Prior Publication Data
US 2021/0209795 A1  Jul. 8, 2021

(51) Int. Cl.
*G06T 9/00* (2006.01)
*G06T 7/73* (2017.01)

(52) U.S. Cl.
CPC ............ *G06T 7/75* (2017.01); *G06T 2200/04* (2013.01); *G06T 2207/10028* (2013.01)

(58) Field of Classification Search
CPC ...................................................... G06T 7/75
(Continued)

(56) References Cited

U.S. PATENT DOCUMENTS 7,957,931 B2  6/2011  Nilsagard et al.
8,264,546 B2  9/2012  Witt
(Continued)

FOREIGN PATENT DOCUMENTS

CA   2902430 A1   9/2014
CN   103302666 A  9/2013
(Continued)

OTHER PUBLICATIONS

Miraldo et al., "Calibration of Smooth Camera Models", Retrieved from internet—https://www.researchgate.net/publication/250920457_Calibration_of_Smooth_Camera_Models, Jun. 6, 2014, 15 Pages.
(Continued)

*Primary Examiner* — Stephen P Coleman
(74) *Attorney, Agent, or Firm* — HP Inc. Patent Department

(57) ABSTRACT

In an example, an apparatus includes a first sensor, a second sensor, and a controller. The first sensor collects a first set of data describing a three-dimensional object that is placed in a constant position in a scene. The second sensor collects a second set of data describing the three-dimensional object. The first sensor has a first position in the scene, while the second sensor has a second position in the scene. The controller generates a first rendering of the three-dimensional object from the first set of data and generates a second rendering of the three-dimensional object from the second set of data. The controller also determines the first position and the second position based on an alignment of the first rendering and the second rendering with a three-dimensional model of the three-dimensional object.

18 Claims, 3 Drawing Sheets

(58) Field of Classification Search
USPC .......................................................... 382/103
See application file for complete search history.

(56) References Cited

U.S. PATENT DOCUMENTS

| | | | |
|---|---|---|---|
| 9,117,278 B2 | 8/2015 | Ehrlich et al. | |
| 9,393,694 B2 | 7/2016 | Wallack et al. | |
| 2002/0169586 A1 | 11/2002 | Rankin et al. | |
| 2004/0130620 A1* | 7/2004 | Buehler | G06K 9/32 348/143 |
| 2008/0063298 A1* | 3/2008 | Zhou | G06K 9/3275 382/280 |
| 2010/0207936 A1* | 8/2010 | Minear | G06T 7/30 345/419 |
| 2012/0197911 A1 | 8/2012 | Banka et al. | |
| 2012/0268093 A1 | 10/2012 | Yamada | |
| 2012/0268493 A1* | 10/2012 | Hayakawa | G06F 3/011 345/633 |
| 2013/0038632 A1* | 2/2013 | Dillavou | G16H 30/40 345/633 |
| 2013/0238128 A1 | 9/2013 | Suzuki | |
| 2014/0184496 A1 | 7/2014 | Gribetz et al. | |
| 2015/0009214 A1 | 1/2015 | Lee et al. | |
| 2016/0006951 A1 | 1/2016 | Moghadam | |
| 2016/0012588 A1 | 1/2016 | Taguchi et al. | |
| 2018/0121713 A1* | 5/2018 | Guo | G06T 7/30 |

FOREIGN PATENT DOCUMENTS

| | | |
|---|---|---|
| JP | 2007-322351 A | 12/2007 |
| JP | 2009-128075 A | 6/2009 |
| RU | 2479039 C1 | 4/2013 |

OTHER PUBLICATIONS

Wiles et al., "Calibrating a Multi-Camera System for 3D Modelling", Retrieved from internet—https://ieeexplore.ieee.org/document/781080/, 1999, 8 Pages.

Fusiello et al: "Virtual environment modeling by Integrated Optical and Acoustic Sensing", Second International Conference on 3-D Digital Imaging and Modeling, Ottawa, ON Oct. 4, 1999, pp. 437-446, XP818358796.

Bernhard Zeisl et al: "Structure-based auto-calibration of RGB-D sensors", 2016 IEEE International Conference on Robotics and Automation (ICRA). May 16, 2016, pp. 5076-5083, XP832988782.

* cited by examiner

SENSORS POSITIONS DETERMINATIONS

BACKGROUND

A three-dimensional (3D) scanning system collects data on the physical characteristics (e.g., shape, size, weight, and/or color) of a 3D object or environment. The collected data can then be used to construct a digital 3D model of the object or environment. For instance, a 3D scanning system may be used by a law enforcement agency to document a crime scene, by a video game developer to render a digital object or character, by a real estate agent to construct a "virtual tour" of a property for sale, by an archaeologist to replicate a cultural artifact, and in other applications.

DETAILED DESCRIPTION

The present disclosure broadly describes an apparatus, method, and non-transitory computer-readable medium for determining the positions of sensors in a three-dimensional (3D) scanning system. As discussed above, a 3D scanning system uses a plurality of sensors to collect data on the physical characteristics (e.g., shape, size, weight, pressure distribution, and/or color) of a 3D object or environment. The collected data can then be used to construct a digital 3D model of the object or environment. The accuracy of the 3D model depends in part on knowledge of the relative positions (i.e., locations and/or orientations) of the sensors, which allows the data collected by the various sensors to be fused into a single model that is a true 3D representation of the 3D object or location.

Examples of the present disclosure determine the respective and/or relative positions of a plurality of sensors in a 3D scanning system, using a single 3D calibration object having known geometry, dimensions, and/or color. In one example, a 3D model is generated of the 3D calibration object prior to scanning. The 3D calibration object is then positioned in the 3D scanning system. Each of the sensors of the 3D scanning system scans the 3D calibration object, and data collected through the scanning allows a controller to generate renderings of the calibration object from the respective points of view of the individual sensors (where any given rendering may or may not include the entire 3D calibration model). The 3D model is then aligned to each rendering, and the respective positions (e.g., locations and/or orientations) of the sensors are derived through sets of transformation parameters. Once the position of each sensor is known, the plurality of sensors can be used together to generate accurate 3D models of 3D objects.

Within the context of the present disclosure, the "position" of a sensor is understood to indicate the location and/or orientation of the sensor in a 3D scanning system. The "location" of a sensor may refer to the sensor's linear position in a 3D space. The "orientation" of a sensor may refer to the sensor's angular position in the 3D space.

Figure 1:
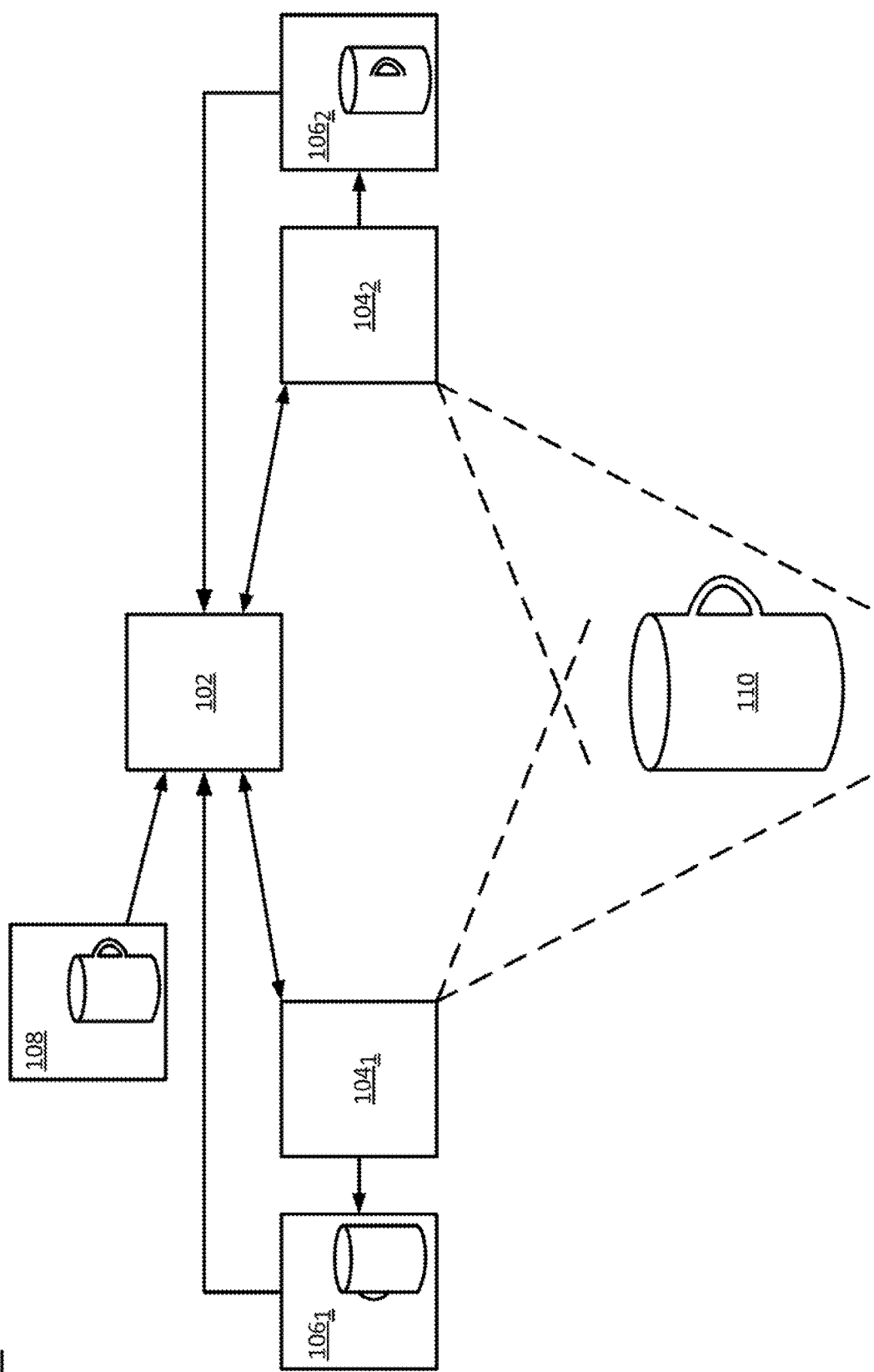
FIG. 1 depicts a high-level block diagram of an example three-dimensional scanning system to determine positions of sensors of the three-dimensional scanning system via a three-dimensional object.

FIG. 1 depicts a high-level block diagram of an example three-dimensional scanning system 100 to determine positions of sensors of the three-dimensional scanning system via a three-dimensional object. As shown in FIG. 1, the electronic device or system 100 generally comprises a controller 102 and a plurality of sensors including a first sensor $104_1$ and a second sensor $104_2$ (hereinafter collectively referred to as "sensors 104").

Although two sensors 104 are illustrated, the system 100 may include any number of sensors. As discussed above, the sensors 104 collect data on the physical characteristics (e.g., shape, size, weight, pressure distribution, and/or color) of a 3D target (e.g., an object or an environment). The sensors 104 may include different types of sensors, such as 3D cameras, color cameras, thermal cameras, depth sensors, pressure plates, and/or other types of sensors. For instance, if the system 100 is used to design custom orthotics, then the sensors may include pressure plates to measure foot pressure (e.g., to quantify the flatness, weight distribution, or other characteristics of the foot) as well as 3D cameras to measure foot size and geometry. The respective fields of view of the sensors 104 may be overlapping or non-overlapping.

The controller 102 is communicatively coupled to the sensors 104 and uses the data collected by the sensors 104 to generate a 3D model of the 3D target. In some examples, the controller 102 may also send signals to the sensors 104 to control the positions of the sensors 104, in order to improve the data collection process. Before the 3D target is scanned, the controller 102 in one example determines the position (e.g., location and/or orientation) of each of the sensors 104. Knowing the relative positions of the sensors 104 helps the controller 102 to fuse the data collected from the sensors 104 into a single, accurate 3D model of the 3D target.

In one example, the positions of the sensors 104 are determined through a calibration process using a 3D calibration object 110 having known geometry and dimensions. The known geometry and dimensions of the 3D calibration object 110 may be described in a 3D model 108 that is made available to the controller 102. In addition, the 3D calibration object 110 may have certain physical characteristics that are designed to aid in determining the positions of specific types of sensors. For instance, an infrared reflective calibration object may be used to determine the position of an infrared camera, a weighted calibration object may be used to determine the position of a pressure plate, a textured calibration object may be used to determine the position of a color sensor, and so on.

The 3D calibration object 110 may be placed in a constant or fixed position in the scene, e.g., such that the location and orientation of the 3D calibration object 110 does not change until the calibration process is finished. Once the 3D calibration object 110 is placed in its constant position, the first sensor $104_1$ scans the 3D calibration object 110 from a first position in the scene, while the second sensor $104_2$ scans the 3D calibration object from a second position in the scene. The first sensor $104_1$ and the second sensor $104_2$ send the data obtained by the scanning to the controller 102. Based on this data, the controller 102 produces a first rendering $106_1$ that depicts the physical characteristics of the 3D calibration object 110 from the perspective of the first sensor $104_1$ and second rendering $106_2$ that depicts the physical characteristics of the 3D calibration object 110 from the perspective of the second sensor $104_2$. The first sensor $104_1$ and the second sensor $104_2$ may operate simultaneously to scan the 3D calibration object 110, or the first sensor $104_1$ and second sensor $104_2$ may operate one at a time (e.g., the second sensor $104_2$ does not begin scanning until the first sensor $104_1$ is done scanning).

Both the first rendering $106_1$ and the second rendering $106_2$ are used by the controller 102, along with the 3D model 108 of the 3D calibration object 110, to determine the positions of the sensors 104. One example of a method for determining the positions of the sensors 104 using this information is described in greater detail with respect to FIG. 2.

Figure 2:
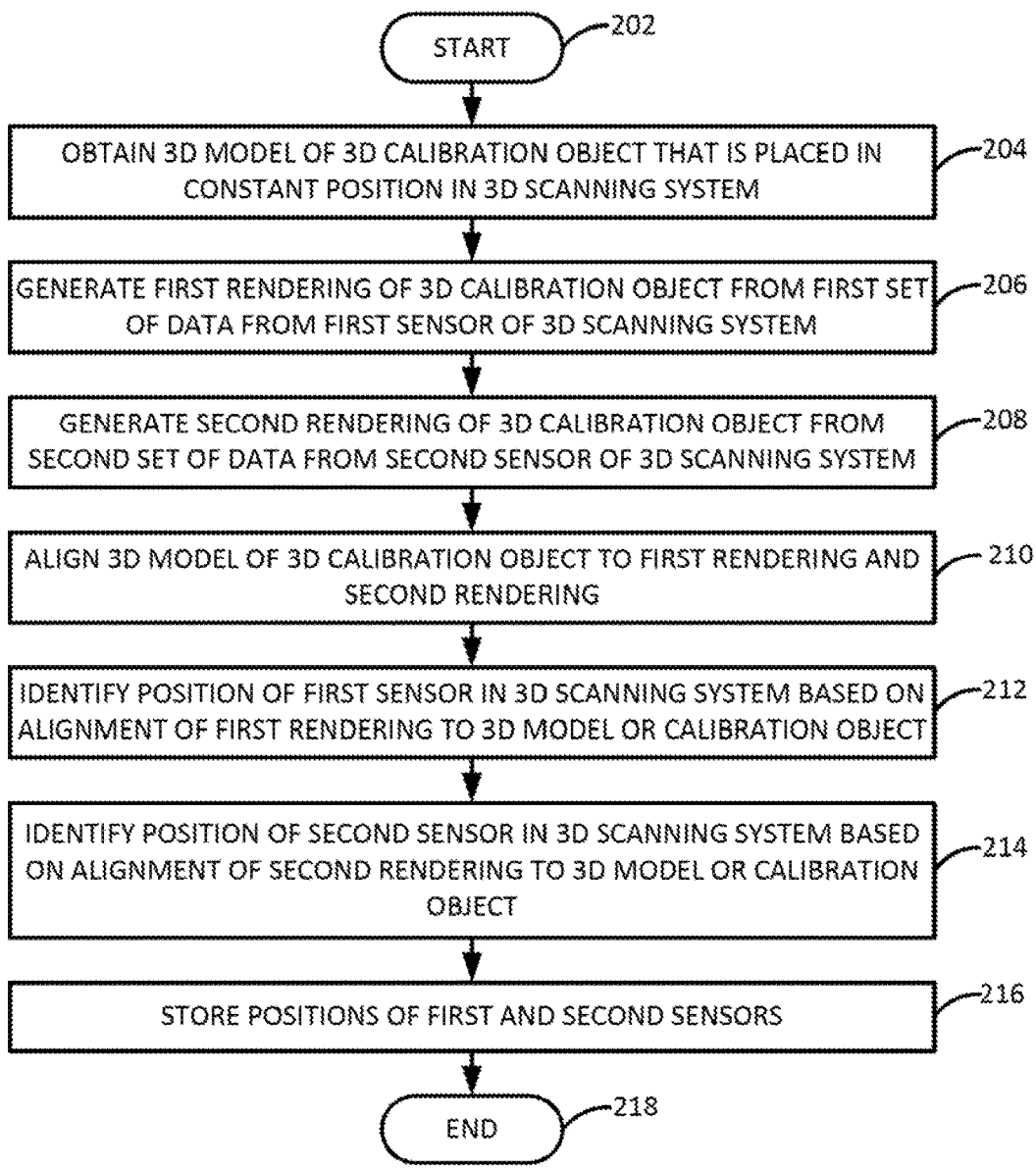
FIG. 2 illustrates a flow diagram of an example method of operation at a three-dimensional scanning system to determine positions of sensors of the three-dimensional scanning system.

FIG. 2 illustrates a flow diagram of an example method 200 of operation at a three-dimensional scanning system to determine positions of sensors of the three-dimensional scanning system. The method 200 may be performed, for example, by the controller 102 of FIG. 1. As such, reference may be made in the discussion of the method 200 to components of the 3D scanning system 100 of FIG. 1. However, such references are made for the sake of example, and are not intended to be limiting.

The method 200 begins in block 202. In block 204, a 3D model of a 3D object, e.g., a 3D calibration object, is obtained. The 3D model describes the geometry and dimensions of the 3D calibration object, as well as potentially other physical characteristics of the 3D calibration object (e.g., color, weight, etc.). The 3D model may be obtained through precision manufacturing (e.g., from computer-aided design data for the 3D calibration object), through 3D scanning of the 3D calibration object by a calibrated 3D scanning system, or through other reliable means.

In block 206, a first rendering of the 3D calibration object is generated from a first set of data describing the 3D calibration object (e.g., describing a physical characteristic of the 3D calibration object). The first set of data may be collected by a first sensor. The first sensor has a first position in a 3D scanning system in which the 3D calibration object is placed in a constant position (e.g., some position having a convenient origin point within the 3D scanning system). From this first position, the first sensor has a first field of view that allows it to detect and scan the physical characteristics of at least part of the 3D calibration object. The type of physical characteristics detected by the first sensor depends on the type of the first sensor. For instance, the first sensor may comprise a 3D camera, a color camera, a thermal camera, a depth sensor, a pressure plates, and/or another types of sensor.

In block 208, a second rendering of the 3D calibration object is generated from a second set of data describing the 3D calibration object (e.g., describing a physical characteristic of the 3D calibration object). The second set of data may be collected by a second sensor. The second sensor has a second position in the 3D scanning system in which the 3D calibration object is placed. From this second position, the second sensor has a second field of view that allows it to detect and scan the physical characteristics of at least part of the 3D calibration object. The second field of view may or may not overlap with the first field of view. The type of physical characteristics detected by the second sensor depends on the type of the second sensor. For instance, like the first sensor, the second sensor may comprise a 3D camera, a color camera, a thermal camera, a depth sensor, a pressure plates, and/or another types of sensor. In one example, the first sensor and the second sensor may comprise different types of sensors. For instance, the first sensor may comprise a 3D camera, while the second sensor comprises a pressure sensor. In one example, the first set of data and the second set of data are collected simultaneously by the first sensor and the second sensor; however, in another example, the first set of data and the second set of data are obtained at different times. However, the position of the 3D calibration object remains constant and does not change between data collection/scanning by the first sensor and the second sensor.

In block 210, the first rendering and the second rendering are aligned to the 3D model of the 3D calibration object. For instance, the first rendering may be aligned to a first portion of the 3D model that it most closely matches, while the second rendering may be aligned to a second portion of the 3D model that it most closely matches. In one example, the first rendering and the second rendering may overlap. That is, certain portions of the 3D calibration object may be depicted in both the first rendering and the second rendering. In one example, the alignment is a two-stage process that involves a first rough, global alignment (e.g., using a 4-points congruent sets algorithm, a super 4-points congruent sets algorithm, a random sample consensus algorithm, or a bundle adjustment algorithm) followed by a second, finer alignment (e.g., using an iterative closest point algorithm or a bundle adjustment algorithm).

In block 212, the position of the first sensor is identified based on the alignment of the first rendering to the 3D model of the 3D calibration object. For instance, the alignment of the first rendering to the 3D model may allow a first set of transformation parameters to be derived, where the first set of transformation parameters describes a position of the first sensor relative to the 3D model. The first set of transformation parameters may comprise, for example, a homogeneous transformation matrix (e.g., a 4×4 matrix used to simultaneously represent rotation and translation), a set of Cartesian coordinates, or the like.

In block 214, the position of the second sensor is identified based on the alignment of the second rendering to the 3D model of the 3D calibration object. For instance, the alignment of the second rendering to the 3D model may allow a second set of transformation parameters to be derived, where the second set of transformation parameters describes a position of the second sensor relative to the 3D model. The second set of transformation parameters may comprise, for example, a homogeneous transformation matrix, a set of Cartesian coordinates, or the like.

In block 216, the positions of the first sensor and the second sensor are stored. In one example, storage of a sensor's position involves storing coordinates that describe the sensor's position (e.g., location and/or orientation). Storage of the sensor's position may also involve storing the set of transformation parameters associated with the sensor's position, so that the set of transformation parameters can be used at a later time, e.g., to correct data collected by the sensor with respect to a new 3D target object to be modeled.

The method 200 ends in block 218.

Once the positions of the sensors have been determined, the 3D scanning system may be ready to scan new 3D target objects. Knowing the respective positions of the sensors within the 3D scanning system allows the 3D scanning system to properly fuse data collected by the sensors into accurate 3D models of the 3D target objects. For instance, the transformation parameters for each of the sensors may be used to guide fusion of the data collected from the sensors (e.g., to correct the position of data or the manner in which two or more pieces of data are fused).

Once the transformation parameters for the individual sensors are derived, transformations between sensors can also be derived. For example, knowing the first set of transformation parameters for the first sensor and the second set of transformation parameters for the second sensor may allow one to determine the position of the first sensor relative to the second sensor.

It should be noted that although not explicitly specified, some of the blocks, functions, or operations of the method 200 described above may include storing, displaying and/or outputting for a particular application. In other words, any data, records, fields, and/or intermediate results discussed in the method 200 can be stored, displayed, and/or outputted to another device depending on the particular application. Furthermore, blocks, functions, or operations in FIG. 2 that recite a determining operation, or involve a decision, do not imply that both branches of the determining operation are practiced. In other words, one of the branches of the determining operation may not be performed, depending on the results of the determining operation.

Figure 3:
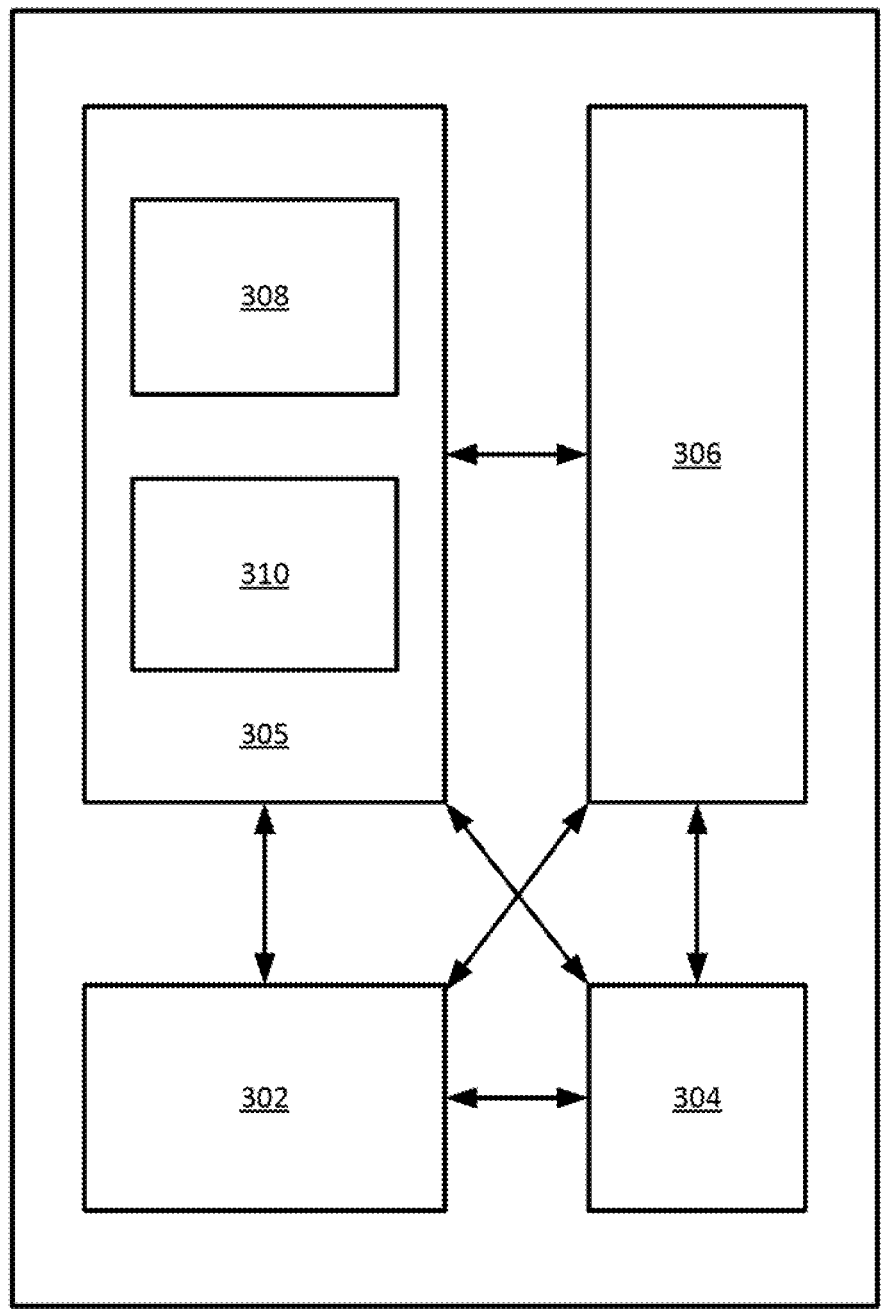
FIG. 3 depicts a high-level block diagram of an example electronic device to determine positions of sensors of a three-dimensional scanning system via a three-dimensional object.

FIG. 3 depicts a high-level block diagram of an example electronic device 300 to determine positions of sensors of a three-dimensional scanning system via a three-dimensional object. For instance, the controller 102 illustrated in FIG. 1 may be configured in a manner similar to the electronic device 300. As such, the electronic device 300 may be implemented as a controller of an electronic device or system, such as a three-dimensional scanning system.

As depicted in FIG. 3, the electronic device 300 comprises a hardware processor element 302, e.g., a central processing unit (CPU), a microprocessor, or a multi-core processor, a memory 304, e.g., random access memory (RAM) and/or read only memory (ROM), a module 305 for determining the positions of sensors in a 3D scanning system, and various input/output devices 306, e.g., storage devices, including but not limited to, a tape drive, a floppy drive, a hard disk drive or a compact disk drive, a receiver, a transmitter, a display, an output port, an input port, and a user input device, such as a keyboard, a keypad, a mouse, a microphone, and the like.

Although one processor element is shown, it should be noted that the electronic device 300 may employ a plurality of processor elements. Furthermore, although one electronic device 300 is shown in the figure, if the method(s) as discussed above is implemented in a distributed or parallel manner for a particular illustrative example, i.e., the blocks of the above method(s) or the entire method(s) are implemented across multiple or parallel electronic devices, then the electronic device 300 of this figure is intended to represent each of those multiple electronic devices.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed method(s).

In one example, instructions and data for the present module or process 305 for determining the positions of sensors in a 3D scanning system, e.g., machine readable instructions can be loaded into memory 304 and executed by hardware processor element 302 to implement the blocks, functions or operations as discussed above in connection with the method 200. For instance, the module 305 may include a plurality of programming code components, including an alignment component 308 and a transformation component 310. These programming code components may be included, for example, in a controller of a 3D scanning system, such as the controller 102 of FIG. 1.

The alignment component 308 may be configured to align a rendering of a 3D calibration object produced based on data collected by a sensor with a 3D model of the 3D calibration object. For instance, the alignment component 308 may be configured to perform all or part of block 210 of the method 200.

The transformation component 310 may be configured to identify a location of a sensor in a 3D scanning system, e.g., by deriving a set of transformation parameters that describe the sensor's location relative to a 3D calibration object. For instance, the transformation component 310 may be configured to perform all or part of blocks 212-214 of the method 200.

Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 305 for determining the positions of sensors in a 3D scanning system, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or an electronic device such as a computer or a controller of a 3D scanning system.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. An apparatus, comprising:
   a first sensor to collect a first set of data describing a three-dimensional object that is placed in a constant position in a scene, wherein the first sensor has a first position in the scene;
   a second sensor to collect a second set of data describing the three-dimensional object, wherein the second sensor has a second position in the scene; and
   a controller to generate a first rendering of the three dimensional object from the first set of data, to generate a second rendering of the three dimensional object from the second set of data, and to determine the first position and the second position based on an alignment of the first rendering and the second rendering with a three-dimensional model of the three-dimensional object.

2. The apparatus of claim 1, wherein the first sensor is a different type of sensor than the second sensor.

3. The apparatus of claim 1, wherein a field of view of the first sensor and a field of view of the second sensor are non-overlapping.

4. The apparatus of claim 1, wherein the first position indicates a location of the first sensor and an orientation of the first sensor, and the second position indicates a location of the second sensor and an orientation of the second sensor.

5. The apparatus of claim 1, wherein the first sensor comprises a camera and the second sensor comprises a pressure plate.

6. The apparatus of claim 5, wherein the camera and pressure plate are arranged to determine a characteristic of a foot to design a custom orthotic.

7. The apparatus of claim 5, wherein the camera is a three-dimensional camera.

8. A non-transitory machine-readable storage medium encoded with instructions executable by a controller of an electronic device, the machine-readable storage medium comprising:
   instructions to align a three-dimensional model of a three-dimensional object to a first rendering of the three-dimensional object that is produced based on a first set of data collected by a first sensor of the electronic device having a first position in a scene;
   instructions to align the three-dimensional model to a second rendering of the three-dimensional object that is produced by based on a second set of data collected by a second sensor of the electronic device having a second position in the scene, wherein a position of the three-dimensional object in the scene remains constant during collection of the first set of data and the second set of data;
   instructions to identify the first position, based on aligning of the three-dimensional model to the first rendering; and
   instructions to identify the second position, based on aligning of the three-dimensional model to the second rendering.

9. The non-transitory machine-readable storage medium of claim 8, wherein the first sensor is a different type of sensor than the second sensor.

10. The non-transitory machine-readable storage medium of claim 8, wherein a field of view of the first sensor and a field of view of the second sensor are non-overlapping.

11. The non-transitory machine-readable storage medium of claim 8, wherein the first position indicates a location of the first sensor and an orientation of the first sensor, and the second position indicates a location of the second sensor and an orientation of the second sensor.

12. The non-transitory machine-readable storage medium of claim 8, wherein the first set of data and the second set of data are collected simultaneously by the first sensor and the second sensor.

13. The non-transitory machine-readable storage medium of claim 8, wherein the instructions to align the three-dimensional model of a three-dimensional object to the first rendering comprises:
   instructions to perform a global alignment of the three-dimensional model of a three-dimensional object to the first rendering; and
   instructions to perform, subsequent to performing the global alignment, a finer alignment of the three-dimensional model to the first rendering.

14. The non-transitory machine-readable storage medium of claim 8, wherein the instructions to identify the first position comprise instructions to derive a first set of transformation parameters that describes a position of the first sensor relative to the three-dimensional object.

15. The non-transitory machine-readable storage medium of claim 14, wherein the first set of transformation parameters comprises a homogeneous transformation matrix.

16. The non-transitory machine-readable storage medium of claim 14, wherein the first set of transformation parameters comprises a set of Cartesian coordinates.

17. A method, comprising:
   aligning, by a controller of an electronic device, a three-dimensional model of a three-dimensional object to a first rendering of the three-dimensional object that is based on a first set of data collected by a first sensor of the electronic device having a first position in a scene;
   aligning, by the controller, the three-dimensional model of the three-dimensional object to a second rendering of the three-dimensional object that is based on a second set of data collected by a second sensor of the electronic device having a second position in the scene, wherein a position of the three-dimensional object in the scene remains constant during collection of the first set of data and the second set of data;
   identifying, by the controller, the first position, based on aligning of the three-dimensional model to the first rendering; and
   identifying, by the controller, the second position, based on aligning of the three-dimensional model to the second rendering.

18. The method of claim 17, wherein a field of view of the first sensor and a field of view of the second sensor are non-overlapping.

* * * * *